US 12,280,463 B2

(12) United States Patent
Ikeda (10) Patent No.: US 12,280,463 B2
(45) Date of Patent: Apr. 22, 2025

(54) WORKPIECE DELIVERY DEVICE

(71) Applicant: HORKOS CORP, Hiroshima (JP)

(72) Inventor: Kunihiro Ikeda, Hiroshima (JP)

(73) Assignee: HORKOS CORP, Hiroshima (JP)

( * ) Notice: Subject to any disclaimer, the term of this patent is extended or adjusted under 35 U.S.C. 154(b) by 875 days.

(21) Appl. No.: 17/299,382

(22) PCT Filed: Nov. 19, 2019

(86) PCT No.: PCT/JP2019/045216
§ 371 (c)(1),
(2) Date: Jun. 3, 2021

(87) PCT Pub. No.: WO2020/129520
PCT Pub. Date: Jun. 25, 2020

(65) Prior Publication Data
US 2022/0032415 A1 Feb. 3, 2022

(30) Foreign Application Priority Data
Dec. 21, 2018 (JP) .................................. 2018-240386

(51) Int. Cl.
*B23Q 7/04* (2006.01)
*B25J 9/04* (2006.01)
(Continued)

(52) U.S. Cl.
CPC ................ *B23Q 7/046* (2013.01); *B25J 9/04* (2013.01); *B25J 9/10* (2013.01); *B25J 18/04* (2013.01); *B23Q 2210/006* (2013.01)

(58) Field of Classification Search
CPC ...... B23Q 7/046; B23Q 2210/006; B25J 9/04; B25J 9/10; B25J 18/04
See application file for complete search history.

(56) References Cited

U.S. PATENT DOCUMENTS 9,623,531 B2   4/2017  Bytow et al.
10,220,523 B2  3/2019  Hasuo
(Continued)

FOREIGN PATENT DOCUMENTS

CN   1646258 A    7/2005
CN   102975199 A  3/2013
(Continued)

OTHER PUBLICATIONS

International Search Report (ISR) dated Feb. 15, 2020 filed in PCT/JP2019/045216.
(Continued)

*Primary Examiner* — Gerald McClain
(74) *Attorney, Agent, or Firm* — RANKIN, HILL & CLARK LLP (57) ABSTRACT

A workpiece delivery device includes a base, a turning center part, a turning arm, a workpiece hand, a track turning mechanism, and a rotation control mechanism, in which the track turning mechanism has a turning drive part, a track turning transmission part, and a track guide part, the rotation control mechanism has a rotation restriction transmission part, a rotation control part, and a rotation restriction receiving part, the turning center part, the turning drive part, the track turning transmission part, the rotation restriction transmission part, and the rotation restriction receiving part are provided on the turning arm, the track guide part and the rotation control part are provided on the base, the rotation restriction receiving part is provided on a workpiece hand support shaft, and the rotation restriction transmission part and the rotation restriction receiving part are connected to each other by a connection part.

20 Claims, 9 Drawing Sheets

(51) Int. Cl.
*B25J 9/10* (2006.01)
*B25J 18/04* (2006.01)

(56) References Cited

U.S. PATENT DOCUMENTS

| | | | |
|---|---|---|---|
| 10,576,624 | B2 | 3/2020 | Nagatsuka |
| 2004/0132595 | A1 | 7/2004 | Grob |
| 2005/0236754 | A1 | 10/2005 | Sugata et al. |
| 2006/0182609 | A1* | 8/2006 | Guerra .................... B25J 9/109 414/744.7 |
| 2008/0253876 | A1 | 10/2008 | Sandmeier |
| 2013/0236277 | A1 | 9/2013 | Bytow et al. |
| 2016/0039063 | A1 | 2/2016 | Nakajima |
| 2018/0021961 | A1 | 1/2018 | Hasuo |
| 2018/0065222 | A1 | 3/2018 | Suzuki et al. |
| 2018/0290295 | A1 | 10/2018 | Nagatsuka |
| 2019/0300295 | A1* | 10/2019 | Malivoir ................. B25J 9/109 |

FOREIGN PATENT DOCUMENTS

| | | | |
|---|---|---|---|
| CN | 103249507 | A | 8/2013 |
| CN | 105328497 | A | 2/2016 |
| CN | 105479451 | A | 4/2016 |
| CN | 107073722 | A | 8/2017 |
| CN | 107639625 | A | 1/2018 |
| CN | 207536769 | U | 6/2018 |
| DE | 202007010097 | U1 | 11/2007 |
| DE | 102007033908 | B3 | 9/2008 |
| EP | 1380382 | A1 | 1/2004 |
| JP | 2-73306 | U | 6/1990 |
| JP | 2001-30190 | A | 2/2001 |
| JP | 2001-150286 | A | 6/2001 |
| JP | 2008-260120 | A | 10/2008 |
| JP | 2013-193197 | A | 9/2013 |
| JP | 5885871 | B1 | 3/2016 |
| JP | 2016-198865 | A | 12/2016 |
| WO | 2012/008321 | A1 | 1/2012 |

OTHER PUBLICATIONS

Chinese Office Action (CNOA) dated Aug. 31, 2022 for Chinese Patent Application No. 201980076171.3; Partial English translation.

Extended European Search Report (EESR) dated Jul. 11, 2022 for European Patent Application No. 19897955.1.

Japanese Office Action (JPOA) issued on Oct. 19, 2023 for Japanese Patent Application No. 2020-561234 and its English machine translation.

* cited by examiner

WORKPIECE DELIVERY DEVICE

TECHNICAL FIELD

The present invention relates to a workpiece delivery device that unloads a workpiece placed on a table of a machine tool or a non-machining station such as a workpiece orientation changing station, and places the workpiece unloaded on a table of another machine tool or another non-machining station.

BACKGROUND ART

As a method for automatically conveying the workpiece, an upper transfer machine such as a gantry that provides a line on an upper portion of the machine tool and conveys the workpiece is well known. However, the upper transfer machine is expensive to manufacture, and a height of entire machine is high, which makes visibility of an entire factory poor, and the upper transfer machine is often not used in factories that place emphasis on safety. In addition, a line that adopts the upper transfer machine has a drawback that it cannot flexibly address addition of machines later, such as increasing the number of machine tools.

Therefore, a machining station (machine tool) that does not intentionally use the upper transfer machine has been developed (Patent Literature 1). Patent Literature 1 discloses a machine tool that allows the table to move up and down in a vertical Y-axis. The machine tool is provided with a machining unit for machining the workpiece and a stand in front of the machining unit. In the machining unit, a spindle is guided by an X-axis and a Z-axis in a horizontal direction. Further, the stand is provided in front of the machining unit, the stand supports a workpiece carriage that moves the workpiece in a vertical direction (Y-axis), and a lower portion of the workpiece carriage supported by the stand is a part of a transfer line.

A large number of machine tools arranged adjacent to each other in an X-axis (a left-right) direction are connected by a conveyor line constituted by a roller conveyor. Then, a slide rail is provided in the stand constituting a part of the conveyor line, and the workpiece conveyed from an upstream side is guided onto the slide rail and delivered to the workpiece carriage. The workpiece that has been machined is conveyed again from the slide rail to the roller conveyor on a downstream side. The workpiece is loaded and unloaded in this way.

Note that in Patent Literature 1, the workpiece is conveyed on the conveyor line while being held by a workpiece support (such as a so-called pallet), delivered to the workpiece carriage, and machined. In this way, since both the workpiece and the workpiece support that clamps the workpiece are delivered to the workpiece carriage, a larger space is required at a discharge point in the stand than that when only the workpiece is loaded and unloaded. In addition, since a larger workpiece carriage is also required, the entire machine is increased in size and an installation space for the machine is increased.

Therefore, Patent Literature 2 discloses a machine tool and a workpiece attachment/removal device that solve the above-mentioned problems while maintaining an excellent mechanical configuration of Patent Literature 1. Similar to Patent Literature 1, the upper transfer machine is not used, and the machine tool that allows the table to move up and down in the vertical Y-axis is used, however, unlike Patent Literature 1, the table on which the workpiece is loaded and unloaded is supported not on the stand that is the part of the conveyor line but on a front surface of a pair of left and right columns erected at intervals in the left-right (X-axis) direction on a bed. Therefore, a footprint of the machine itself can be made relatively small.

Further, the workpiece attachment/removal device that causes the workpiece to be loaded and unloaded of the table includes a workpiece placement table on left and right sides of the table, a conveyor line parallel to the X-axis direction in front of the table, and a pair of clamping arms arranged on the conveyor line. The pair of clamping arms includes a clamping arm that loads the workpiece on the workpiece placement table on the upstream side to the table and a clamping arm that unloads the workpiece on the table to the workpiece placement table on the downstream side.

Unlike Patent Literature 1, since the machine tool and the workpiece attachment/removal device disclosed in Patent Literature 2 omit the workpiece support and cause the workpiece to be directly loaded and unloaded of the table, the table for the workpiece support and the columns that support the table are prevented from being increased in size, and thus increase in size of the entire machine is avoided. Further, since only weight and size of the workpiece matter, a moment of inertia applied to the table is remarkably smaller than that in Patent Literature 1, and the increase in size of the entire machine can be prevented in that respect as well. Therefore, a speed of Y-axis (up and down) movement of the table can also be further increased, and there are various excellent advantages such as reducing a cycle time of machining.

However, although the machine tool of Patent Literature 2 can save the footprint of the machine itself, it is necessary to provide a conveyor line in front of the machine tool for the workpiece attachment/removal device for loading and unloading the workpiece, and an installation space for the conveyor line is required separately. Further, for at least one machine tool, one workpiece placement table must be installed on each of the left and right sides of the table (upstream side and downstream side of the machine tool). In a line including a large number of machine tools installed adjacent to each other in the left-right direction of the machine, a space for the workpiece placement table is always required between the machines, which makes it difficult to save space. Further, in order to load and unload the workpiece, the workpiece must be once placed on the workpiece placement table, and in a line where a large number of machine tools are arranged, a time required for loading and unloading the workpiece cannot be reduced.

Further, for one machine tool, a pair of clamping arms including a clamping arm for loading the workpiece and a clamping arm for unloading the workpiece is required. Each of the clamping arms requires a driver such as a plurality of motors in order to attach or detach the workpiece and move on the conveyor line. Furthermore, for example, the workpiece placement table also requires the driver when a workpiece receiver is configured to be raised and lowered, and each device constituting the workpiece attachment/removal device requires a certain manufacturing cost. The workpiece attachment/removal device according to Patent Literature 2 is used in the line where a large number of machine tools are arranged, and its manufacturing cost is inevitably increased.

Further, the workpiece attachment/removal device according to Patent Document 2 is specialized for use in a machine tool having a structure in which the table moves in the Y-axis, and cannot be applied to a machine tool having a structure other than that. Furthermore, the line is equipped with a station for changing a workpiece orientation, a station for cleaning the workpiece, a station for receiving and delivering the workpiece with another line, a station for inspection, and a station for measurement, in addition to machine tools, and the workpiece is often loaded and unloaded between the machine tool and the non-machining stations, and between the non-machining stations, in addition to between machine tools.

CITATION LIST

Patent Literature

Patent Literature 1: EP 1,380,382
Patent Literature 2: Japanese Patent No. 5885871

SUMMARY OF THE INVENTION

Problems to be Solved by the Invention

The present invention solves the above problems, and an object of the present invention is to provide a workpiece delivery device that does not require a separate space for the workpiece delivery device in addition to an installation space for the machine tool, reduces the time required for loading and unloading the workpiece by directly loading and unloading the workpiece between adjacent machines, and can reduce the manufacturing cost with a simple structure. Further, another problem to be solved by the present invention is to provide a workpiece delivery device that can be used not only for the machine tool having the structure in which the table moves in the Y-axis, but also for the machine tool having another structure and the non-machining station, and does not interfere with a degree of freedom in line configuration.

Solution to the Problems

The present invention for solving the above problems is a workpiece delivery device that unloads a workpiece from a table on one side and loads the workpiece to a table on the other side between machine tools constituting a line, between the machine tool and a non-machining station, or between non-machining stations, the workpiece delivery device including: a base; a turning center part provided on the base; a turning arm that horizontally turns above and in front of the machine tool and the non-machining station about an axis of the turning center part; a workpiece hand that is suspended and supported by a tip portion of the turning arm; a turning arm that determines a conveyor track of the workpiece; and a rotation control mechanism that controls an orientation of the workpiece hand, in which the track turning mechanism has a turning drive part, a track turning transmission part, and a track guide part, the rotation control mechanism has a rotation restriction transmission part, a rotation control part, and a rotation restriction receiving part, the turning center part, the turning drive part, the track turning transmission part, the rotation restriction transmission part, and the rotation restriction receiving part are provided on the turning arm, at least one of the track guide part and the rotation control part is provided on the base, the rotation restriction receiving part is provided on a workpiece hand support shaft that rotatably supports the workpiece hand, and the rotation restriction transmission part and the rotation restriction receiving part are connected to each other by a connection part.

Then, the turning arm has a base arm part supported by the turning center part, a linear motion guide mechanism fixed to the base arm part, and a sliding arm part that slides on the base arm part by the linear motion guide mechanism, and the track turning transmission part and the rotation restriction transmission part are provided on the sliding arm part.

Furthermore, the rotation control part is a rotation control hole or a rotation control groove provided in a rotation control plate.

Further, the rotation restriction transmission part has a sprocket or a gear provided on a central axis of the rotation restriction transmission part, and a cam follower provided at a position eccentric from the central axis, the cam follower engages with the rotation control hole or the rotation control groove, the rotation restriction receiving part is a sprocket or a gear provided on the workpiece hand support shaft, and the connection part is a chain or a timing belt that connects the sprockets or the gears.

Furthermore, the turning drive part of the workpiece delivery device according to a first, second, fourth, and fifth embodiments is a motor provided in the turning center part. Further, the turning arm may be provided with a fluid pressure cylinder as a turning drive auxiliary part.

Further, as in the workpiece delivery device according to a third and sixth embodiments, the motor may be a central axis of the turning drive part.

Further, as in the workpiece delivery device according to the first, second, and third embodiments, a central axis of the track turning transmission part and a central axis of the rotation restriction transmission part may be provided coaxially.

Alternatively, as in the workpiece delivery device according to the fourth, fifth, and sixth embodiments, a central axis of the track turning transmission part and a central axis of the rotation restriction transmission part may be provided on different axes.

Then, as in the workpiece delivery device according to the first, third, fourth, and sixth embodiments, a track guide plate and a track guide hole provided in the track guide plate may be used for the track guide part, and a bearing that engages with the track guide hole may be used as the track turning transmission part.

Alternatively, as in the workpiece delivery device according to the third and sixth embodiments, the track turning transmission part may have a sprocket or a gear, the track guide hole may be provided with a chain or a belt, and the sprocket or the gear may engage with the chain or the belt.

Further, as in the workpiece delivery device according to the second and fifth embodiments, the track turning transmission part may be a roller, the track guide part may be a track guide rail, and the roller may travel with the track guide rail in between.

Further, as in the workpiece delivery device according to the fourth and sixth embodiments, the track guide hole and a rotation control hole or a rotation control groove provided in a rotation control plate may be provided in one plate.

Note that the base of the workpiece delivery device described above is a column erected on a floor, and does not require a special space for the workpiece delivery device.

Further, a length of the workpiece hand support shaft may be determined according to a configuration of the machine tool or the non-machining station.

Effects of the Invention

According to the workpiece delivery device according to the present invention, the driver for the workpiece delivery device is very small and the workpiece delivery device has a simple structure, and the manufacturing cost can be reduced.

In addition, even if there is a change in configuration of the machine tool that constitute the line or in type of the non-machining station, it is possible to load and unload the workpiece, for example, between the machine tools, or between the machine tool and the station, and to flexibly respond to the change in the line configuration.

DESCRIPTION OF THE EMBODIMENTS

Hereinafter, a first embodiment according to the present invention will be described with reference to FIGS. 1 to 4. In the figures, the same parts or corresponding parts are denoted by the same reference numerals.

Figure 1:
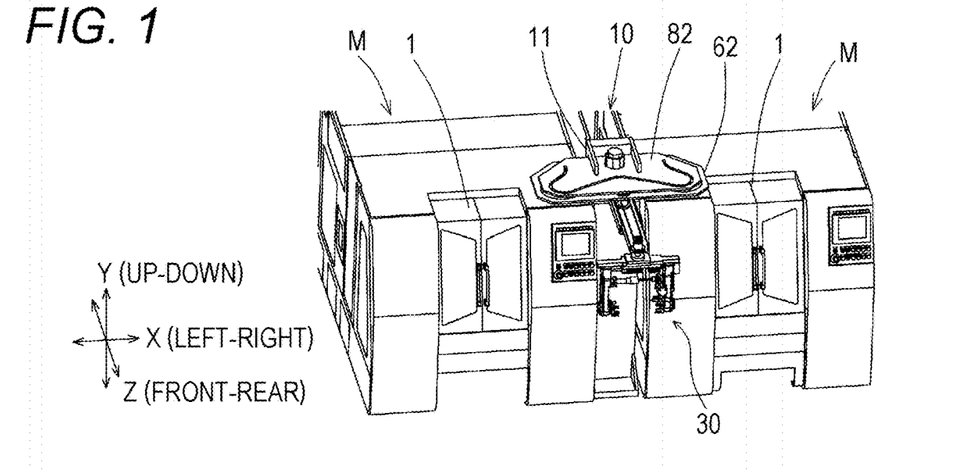
FIG. 1 is an external view illustrating that a workpiece delivery device according to the present invention is installed between two machine tools.

FIG. 1 is a view illustrating a workpiece delivery device 10 installed between two machine tools M in a line including a machine tool M, a non-machining station S, and the like. The machine tool M in which the workpiece delivery device 10 according to the present invention is used is a horizontal machine tool having a spindle maintained horizontally. The spindle is provided to be movable in three directions: an X-axis (a left-right) direction, a Y-axis (an up-down) direction, and a Z-axis (a front-rear) direction. Reference numeral 1 in FIG. 1 is an opening and closing cover for the machine tool M. A workpiece is loaded and unloaded with the opening and closing cover 1 open.

Figure 2:
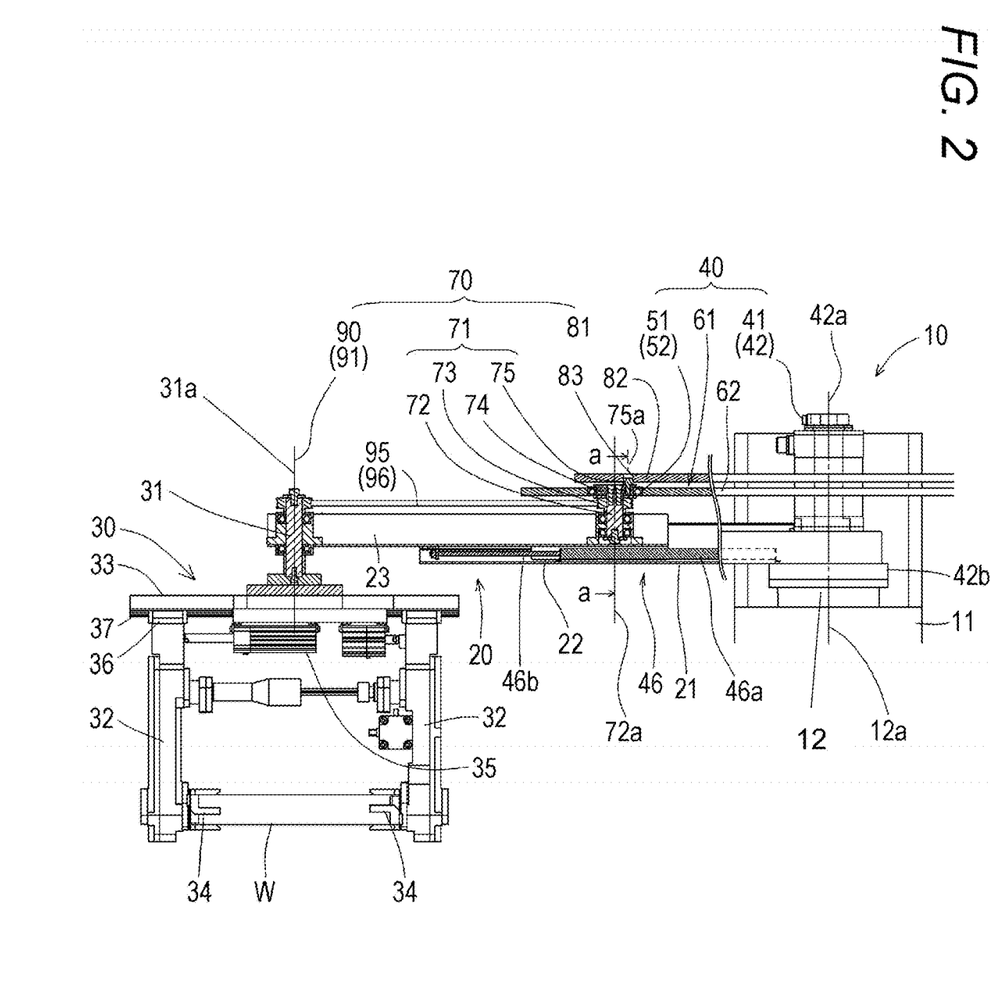
FIG. 2 is a front sectional-view of the workpiece delivery device according to a first embodiment of the present invention.

As illustrated in FIG. 2, the workpiece delivery device 10 includes a columnar base 11 erected on a floor between the machine tools M, a turning center part 12 provided on the base 11, a turning arm 20 supported by the turning center part 12, a workpiece hand 30 that clamps a workpiece W, a track turning mechanism 40 that determines a conveyor track of the workpiece W, and a rotation control mechanism 70 that controls an orientation of the workpiece hand 30.

Figure 3:
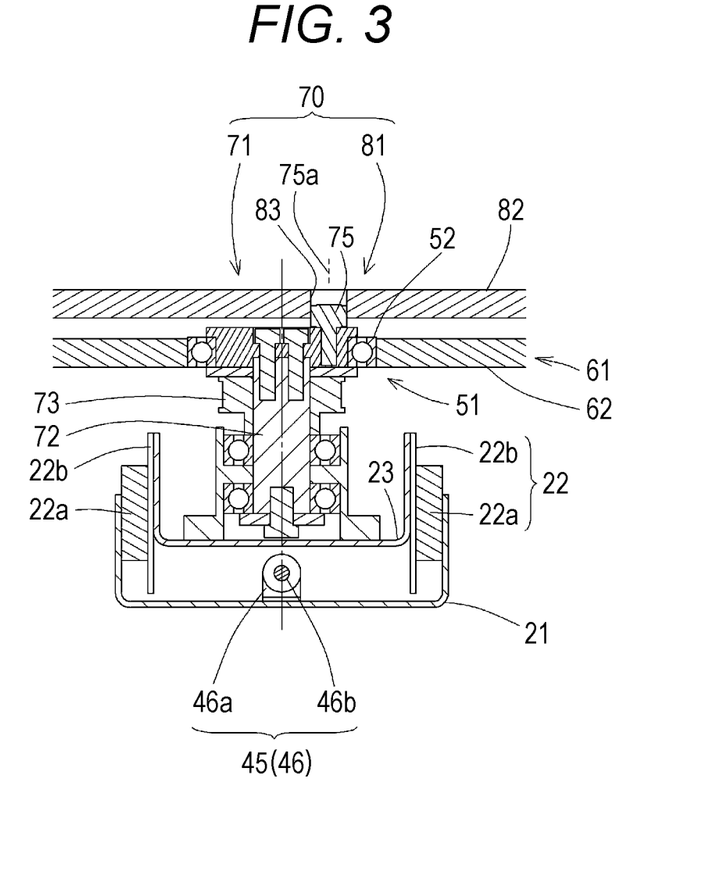
FIG. 3 is a cross-sectional view taken along a line a-a of FIG. 2.

The turning arm 20 has a base arm part 21 supported by the turning center part 12, a linear motion guide mechanism 22, and a sliding arm part 23. As illustrated in FIG. 3, the base arm part 21 and the sliding arm part 23 have a shape like a cross-sectional groove-shaped steel (U-shape), but the base arm part 21 is provided wider than the sliding arm part 23. Inside both side surfaces of the base arm part 21, slide rails 22a of the linear motion guide mechanism 22 are fixed. Further, outside both side surfaces of the sliding arm part 23, sliders 22b of the linear motion guide mechanism 22 are fixed. The sliding arm part 23 slides on the base arm part 21 in accordance with movement of the slider 22b sliding on the slide rail 22a.

Next, the workpiece hand 30 will be described. At a tip portion of the sliding arm part 23, a workpiece hand support shaft 31 is provided rotatably about a vertical rotating shaft 31a, and suspends and supports the workpiece hand 30. The workpiece hand 30 has a pair of clamping arm parts 32 provided at intervals in the X-axis direction, a bracket 33 connecting the pair of clamping arm parts 32, and chuck parts 34 that clamp the workpiece W at tip portions of the clamping arms 32. The pair of clamping arm parts 32 is opened and closed in the left-right direction by an air cylinder 35 so that the workpiece W can be attached and detached. Slide parts 36 are provided at upper ends of the clamping arms 32 and move on a guide track 37 provided on a connecting bracket 33 to open and close to the left and right.

Subsequently, the track turning mechanism 40 that determines the conveyor track of the workpiece W will be described. The track turning mechanism 40 includes a turning drive part 41, a track turning transmission part 51, and a track guide part 61.

The turning drive part 41 is a motor 42 provided in the turning center part 12 of the base 11. The motor 42 supports a rear end of the base arm part 21 of the turning arm 20 in a rotating part 42b having a central axis 42a in a vertical direction, and the turning arm 20 turns by rotation of the motor 42. The motor central axis 42a is coaxial with a central axis 12a of the turning center part.

Figure 4:
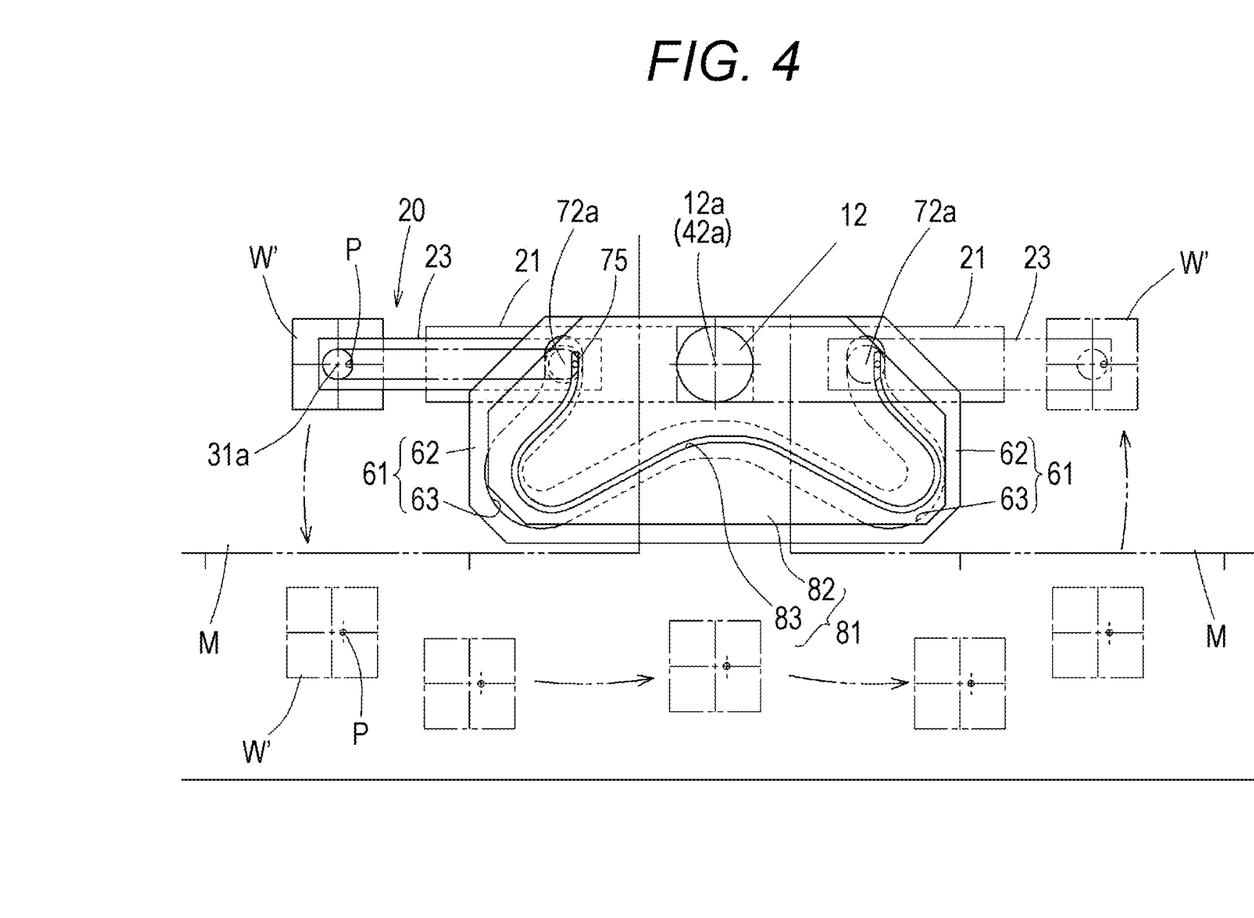
FIG. 4 is a schematic plan view of the workpiece delivery device according to the first embodiment of the present invention.

Next, the track guide part 61 will be described. FIG. 4 is a schematic plan view illustrating the conveyor track of the workpiece W. Reference numeral W' assumes a maximum size of the workpiece W that is clamped by the workpiece hand 30 and conveyed between the machine tools M. When the turning arm 20 turns above and forward of the machine tool M from the left side to the right side (on the paper) about the turning center part 12, the workpiece W' clamped by the workpiece hand 30 needs to be conveyed without hitting the machine tool M. Further, from a viewpoint of safety measures, it is desirable that the workpiece hand 30 that clamps the workpiece W' passes a track that does not greatly project in front of the machine tool M.

As illustrated in FIG. 4, the track guide part 61 has a track guide plate 62 and a track guide hole 63 provided in the track guide plate 62. When the turning arm 20 travels on the track while turning along the track guide hole 63, a sliding amount of the sliding arm part 23 is adjusted so that the workpiece hand 30 does not project significantly forward of the machine tool M by the track turning transmission part 51 to be described later.

Next, the rotation control mechanism 70 will be described. Reference numeral P shown in FIG. 4 is a mark indicating that the workpiece W' is loaded to the next machine tool M while maintaining the orientation when the workpiece W' was unloaded from the machine tool M. The rotation control mechanism 70 restricts and controls rotation of the workpiece hand support shaft 31 that supports the workpiece hand 30 in order to keep the workpiece W' in the same orientation. The rotation control mechanism 70 includes a rotation restriction transmission part 71, a rotation control part 81, and a rotation restriction receiving part 91.

As illustrated in FIG. 4, the rotation control part 81 has a rotation control plate 82 and a rotation control hole 83 provided in the rotation control plate 82. Further, as illustrated in FIG. 2, the rotation restriction transmission part 71 has a pulley 73 that is fitted onto a shaft 72 rotatably supported by a rear end of the sliding arm part 23 and having a central axis 72a in the vertical direction, and a cam follower 75 having a central axis 75a in the vertical direction at a position eccentric from the central axis 72a in a large diameter part 74 that is provided at an upper end of the shaft 72 and has a diameter larger than that of the shaft 72. The cam follower 75, which is the rotation restriction transmission part, is engaged with the rotation control hole 83 which is the rotation control part. Note that the rotation control hole 83 may be a groove (rotation control groove).

Here, the track turning transmission part 51 will be described. The track turning transmission part 51 is a bearing 52 fitted onto an outer periphery of the large diameter part 74 of the shaft 72, which is the rotation restriction transmission part 71, and is provided coaxially with the central axis 72a of the shaft 72. The bearing 52, which is the track turning transmission part, engages with the track guide hole 63, which is the track guide part, and the bearing 52 advances in the track guide hole 63 by the rotation of the motor 42 which is the turning drive part. A shape of the track guide hole 63 is substantially W-shaped in a plan view, and the bearing 52 engaged with the track guide hole 63 adjusts the sliding amount of the sliding arm part 23. When the workpiece W' clamped by the workpiece hand 30 enters and exits a machining chamber R of the machine tool M, the sliding amount of the sliding arm part 23 is increased to avoid interference with the machine tool M, and when the workpiece W' is conveyed in front of the machine tool M, the sliding amount of the sliding arm part 23 is reduced so that the workpiece W' follows the conveyor track substantially parallel to the X-axis direction.

According to movement of the turning arm 20 being guided in the track and turning in this way, the cam follower 75 engaged with the rotation control hole 83 advances in the rotation control hole 83. While advancing, the central axis 75a of the cam follower 75 is always maintained to be on the right side (on the same X-axis) of the central axis 72a of the shaft 72 in a plan view as illustrated in FIG. 4, and a shape of the rotation control hole 83 is eccentric to the right side in a plan view from a center of the track guide hole 63 so that rotation of the shaft 72, the pulley 73, and the large diameter part 74 is restricted and controlled. Note that the mark P shown in FIG. 4 reflects and expresses a positional relationship between the cam follower 75 and the central axis 75a with respect to the central shaft 72 on the workpiece hand support shaft 31.

Next, a rotation restriction receiving part 90 will be described. As illustrated in FIG. 2, the rotation restriction receiving part 90 has a pulley 91 fitted onto an upper portion of the workpiece hand support shaft 31. The pulley 91 is provided at the same diameter and the same height position as the pulley 73 which is the rotation restriction transmission part, and is connected to the pulley 73 which is the rotation restriction transmission part by a timing belt 96 which is a connection part 95. Then, rotation of the pulley 91, which is the rotation restriction receiving part, is synchronized with rotation of the pulley 73, which is the rotation restriction transmission part, and the pulley 91 is also subject to rotation restriction. Along with this, the rotation of the workpiece hand support shaft 31 is also restricted and controlled, and while the workpiece hand 30 maintains the orientation when the workpiece W' was clamped and unloaded from the machine tool M, the workpiece W' is conveyed and loaded to the next machine tool M.

By the way, as illustrated in FIG. 4, there may be a place where the bearing 52 that is engaged and advances in the track guide hole 63 cannot smoothly advance in the track guide hole 63 with only a driving force of the motor 41, which is the turning drive part, depending on the shape of the track guide hole 63. Therefore, as illustrated in FIGS. 2 and 3, a fluid pressure cylinder 46 may be provided in the turning arm 20 as a turning drive auxiliary part 45.

In the fluid pressure cylinder 46, a cylinder body part 46a such as a cylinder tube is fixed inside a bottom surface of the base arm part 21, and an end portion 46c of a piston rod part 46b is fixed outside a bottom surface of the sliding arm part 23. The piston rod part 46b is expanded and contracted according to a position of the track guide hole 63, and a sliding direction of the sliding arm part 23 is controlled, to assist the turning arm 20 to turn smoothly.

Next, a workpiece delivery device 100 according to a second embodiment, specifically, a track turning transmission part 151, a track guide part 161, and a rotation restriction transmission part 171, which are different from those in the first embodiment will be described with reference to FIGS. 5 and 6. The same reference numerals are used for the same components as those in the first embodiment.

Figure 5:
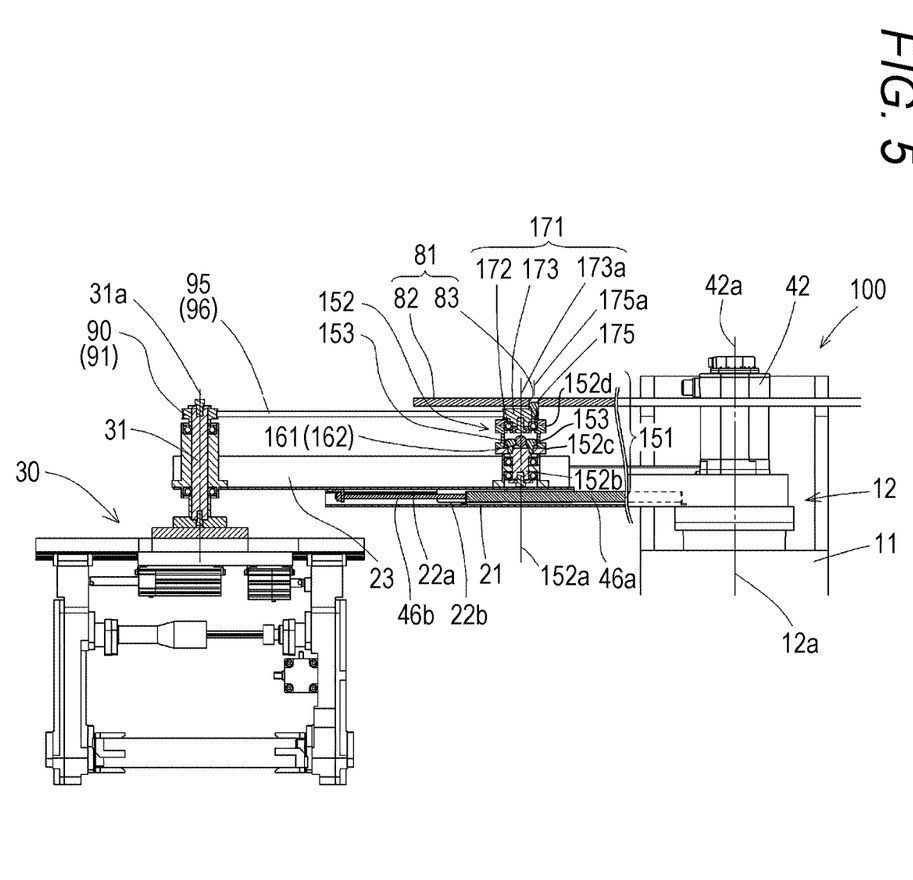
FIG. 5 is a front sectional-view of the workpiece delivery device according to a second embodiment of the present invention.
Figure 6:
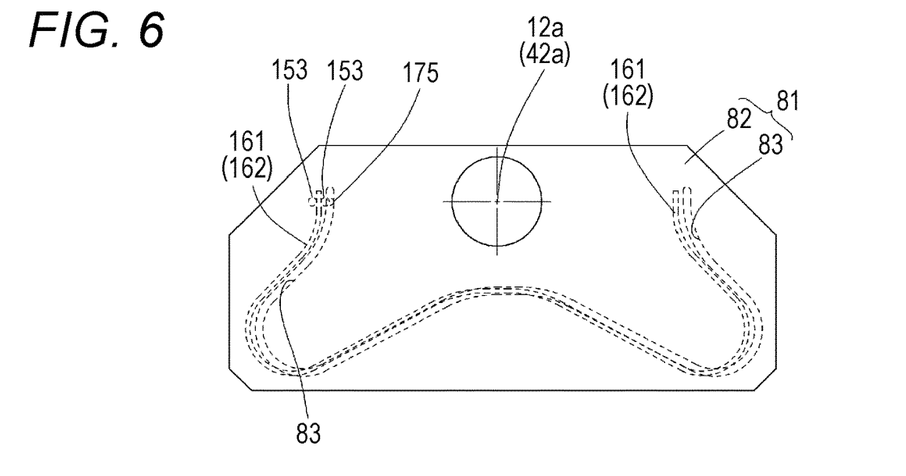
FIG. 6 is a plan view of the workpiece delivery device according to the second embodiment of the present invention.

As illustrated in FIG. 5, the track turning transmission part 151 includes a rotating body 152 rotatably supported by the rear end of the sliding arm part 23, and a roller 153 provided in the rotating body 152. The rotating body 152 has a shaft part 152b having a vertical central axis 152a, a flange part 152c provided on an upper portion of the shaft part 152b, and a hollow spacer 152d connected to the flange part 152c with a bolt or the like. The roller 153 is fixed and supported by the flange part 152b, and is provided to be rotatable in the hollow spacer 152d.

Next, other embodiments will be described.

Second Embodiment

The track guide part 161 in the second embodiment is a rail 162 formed of a round bar or the like. The hollow spacer 152d has a through-hole (not shown) through which the rail 162 can penetrate, the roller 153 which is the track turning transmission part travels on the track with the rail 162 in between, and the sliding amount of the sliding arm part 23 is adjusted.

Next, the rotation restriction transmission part 171 will be described. The rotation restriction transmission part 171 includes a bearing 172 fitted coaxially onto the central axis 152a of the rotating body 152, a pulley 173 fitted into an inner ring portion of the bearing 172, and a cam follower 175 having a vertical central axis 175a at a position eccentric from a central axis 173a of the pulley 173, in the hollow spacer 152d which is the rotating body 152 of the track turning transmission part 151. The cam follower 175 is engaged with the rotation control hole 83 which is the rotation control part 81, and the rotation restriction transmission part 171 restricts and controls the rotation.

Third Embodiment

A workpiece delivery device 200 according to a third embodiment will be described with reference to FIGS. 7 and 8. Specifically, a turning drive part 241, a track turning transmission part 251, a track guide part 261, and a rotation restriction transmission part 271, which are different from those in the above-described embodiments, will be mainly described. Further, the same components as those in the above-described embodiments are denoted by the same reference numerals.

Figure 7:
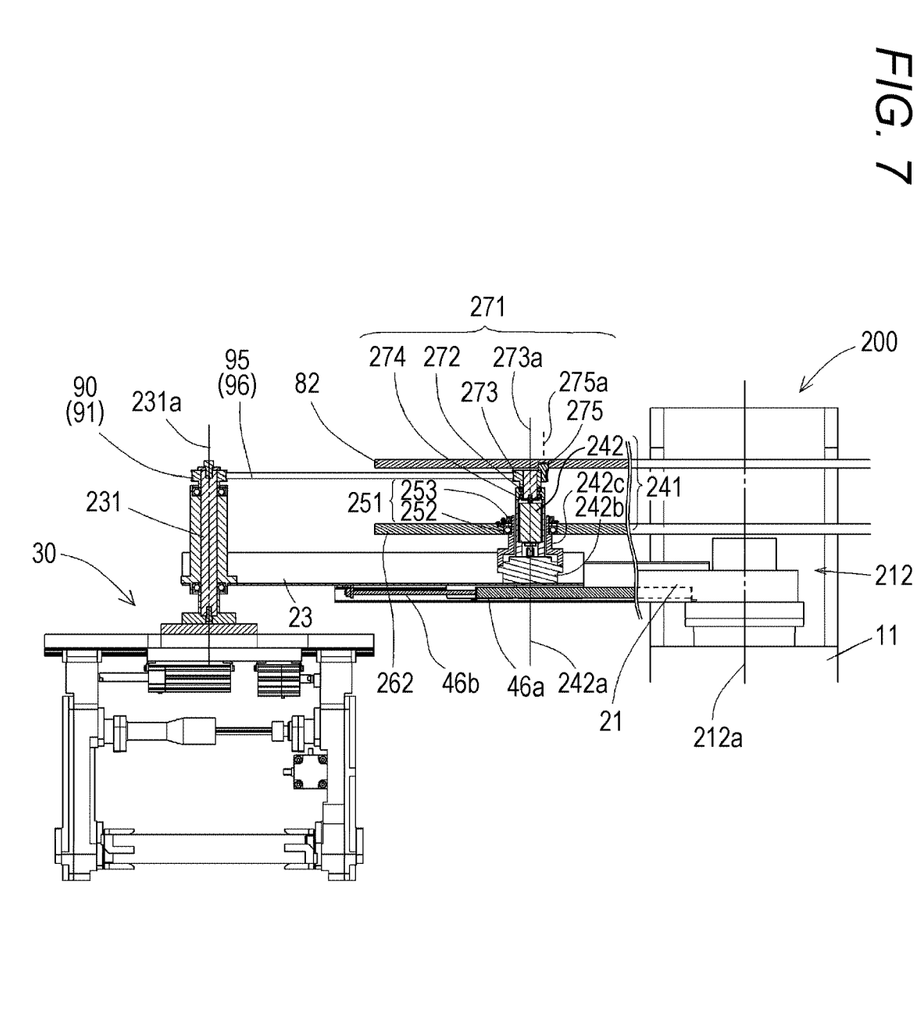
FIG. 7 is a front sectional-view of the workpiece delivery device according to a third embodiment of the present invention.
Figure 8:
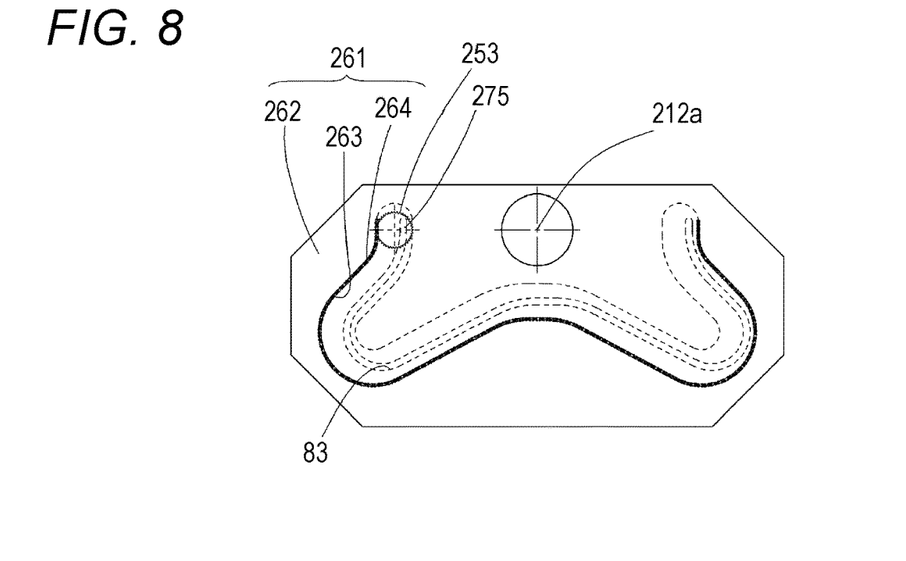
FIG. 8 is a plan view of the workpiece delivery device according to the third embodiment of the present invention.

As illustrated in FIG. 7, the turning drive part 241 in the workpiece delivery device 200 is a motor 242 provided not in a turning center part 212 but in the rear end of the sliding arm part 23. A rotation axis 212a is provided in the turning center part 212, and the turning arm 20 is supported so that it can turn. The motor 242 which is the turning drive part has a non-rotating part 242b and a rotating part 242c that rotates about a vertical central axis 242a, and the non-rotating part 242b is installed at the rear end of the sliding arm part.

The track turning transmission part 251 is provided on an outer periphery of the rotating part 242c of the motor 242. The track turning transmission part 251 has a bearing 252 fitted onto the outer periphery of the motor rotating part 242c and a sprocket 253. The track guide part 261 has a track guide plate 262, a track guide hole 263 provided in the track guide plate 262, and a chain 264 provided along an outer periphery of the track guide hole 263.

The bearing 252 and the sprocket 253 which are the turning drive part respectively engage with the track guide hole 263 and the chain 264 which are the track guide part, and advance in the track guide hole 263 by rotation of the motor 242, to turn the turning arm 20.

The rotation restriction transmission part 271 of the third embodiment has a bearing 272 provided to be coaxial with the motor central axis 242a, a pulley 273 fitted into an inner ring portion of the bearing 272, and a cam follower 275 having a central axis 275a in an extension direction at a position eccentric from a central axis 273a of the pulley 273. In the bearing 272, a sleeve 274 is installed above the motor rotating part 242c, the bearing 272 is fitted inside the sleeve 274, and a shaft part 273b of the pulley 273 is fitted into the inner ring portion of the bearing 272. The cam follower 275 engages with a rotation control groove 83 to restrict rotation of the pulley 273.

Note that since the pulley 273, which is the rotation restriction transmission part of the third embodiment, is provided on an upper portion of the motor 242, it is installed at a position slightly higher than the pulleys (73, 173) in the above-described embodiments, and thus a workpiece hand support shaft 231 is provided longer than that of the above-described embodiments so that the pulley 91, which is the rotation restriction receiving part, is also installed according to the position slightly higher than the pulleys.

Further, in the workpiece delivery device 200 of the third embodiment, the turning drive part 241 and the track turning transmission part 251, and the rotation restriction transmission part 271 are all coaxially provided at the rear end of the sliding arm part 23.

Fourth Embodiment

A workpiece delivery device 300 of a fourth embodiment will be described with reference to FIGS. 9 and 10. Specifically, a track turning transmission part 351 and a rotation restriction transmission part 371, which are different from those in the above-described embodiments, will be mainly described. In the fourth embodiment, as in the first and second embodiments, the motor 42 which is the turning drive part 41 is provided in the turning center part 12. The same components as those in the above-described embodiments are denoted by the same reference numerals.

The track turning transmission part 351 and the rotation restriction transmission part 371 of the fourth embodiment are both provided on the sliding arm part 23 as in the first embodiment, the second embodiment, and the third embodiment, but their central axes are not coaxial and are provided separately. As illustrated in FIG. 9, the track turning transmission part 351 is provided at a rearmost end of the sliding arm part 23, and the rotation restriction transmission part 371 is provided in front of the track turning transmission part 351, that is, slightly behind a center in a longitudinal direction of the sliding arm part 23.

The track turning transmission part 351 has a non-rotating shaft 352 and a roller 353 provided at an upper end of the non-rotating shaft 352. The non-rotating shaft 352 has a central axis 352a in the vertical direction and is fixed to the rear end of the sliding arm part 23. Further, the roller 353 is provided on an upper surface of a rotating body 355 rotatably provided on an outer ring portion of a bearing 354 fitted to the upper end of the non-rotating shaft 352. The track guide part according to the fourth embodiment is the same as the rail 162 of the track guide part 161 of the second embodiment.

Further, the rotation restriction transmission part 371 according to the fourth embodiment has a shaft 372 provided slightly behind the center in the longitudinal direction of the sliding arm part 23, a pulley 373 fitted onto the shaft 372, and a cam follower 375 provided on an upper surface of the pulley 373. The shaft 372 is rotatably supported about a vertical central axis 372a, and the cam follower 375 is provided to have a vertical central axis 375a at a position eccentric from the central axis 372a.

Figure 9:
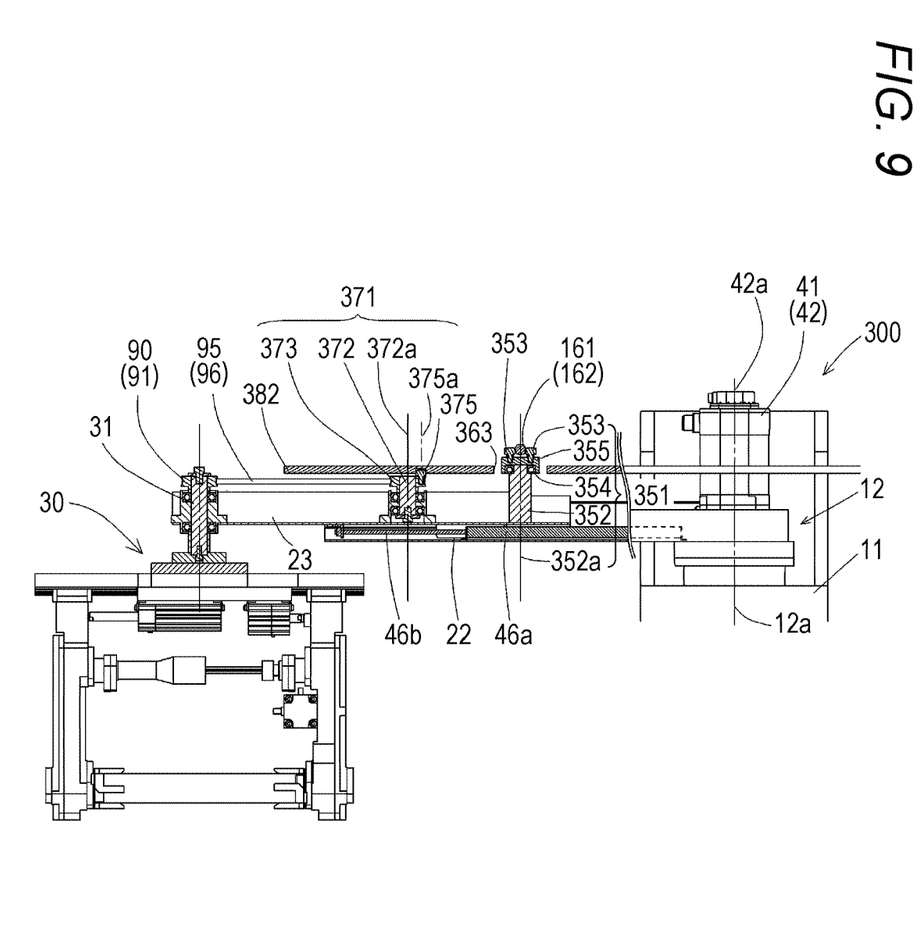
FIG. 9 is a front sectional-view of the workpiece delivery device according to a fourth embodiment of the present invention.
Figure 10:
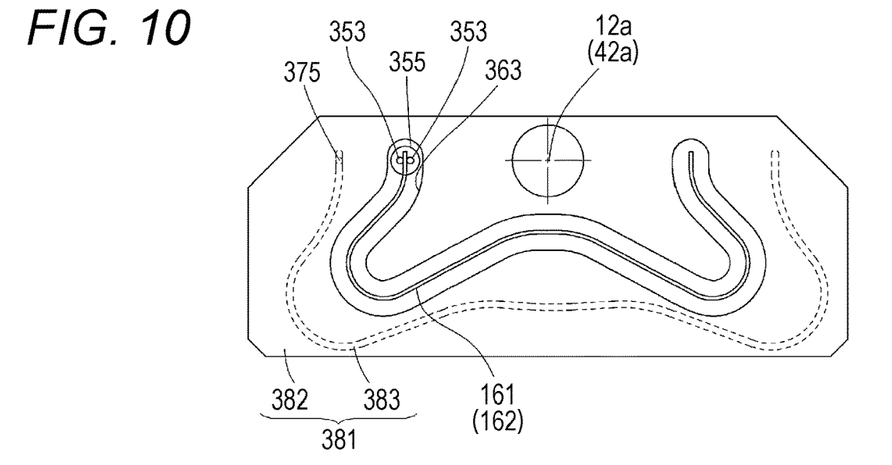
FIG. 10 is a plan view of the workpiece delivery device according to the fourth embodiment of the present invention.

As illustrated in FIGS. 9 and 10, a rotation control part 381 that restricts rotation of the rotation restriction transmission part 371 with the cam follower 375 engaged has a rotation control plate 382 and a rotation control groove or hole 383 provided in the rotation control plate 382. Further, in order to prevent interference between the track turning transmission part 351 and the rotation control plate 382, the rotation control plate 382 is provided with a hole 363 having a shape along the rail 162 which is the track guide part and having a size through which the rotating body 355 can pass.

Fifth Embodiment

Figure 11:
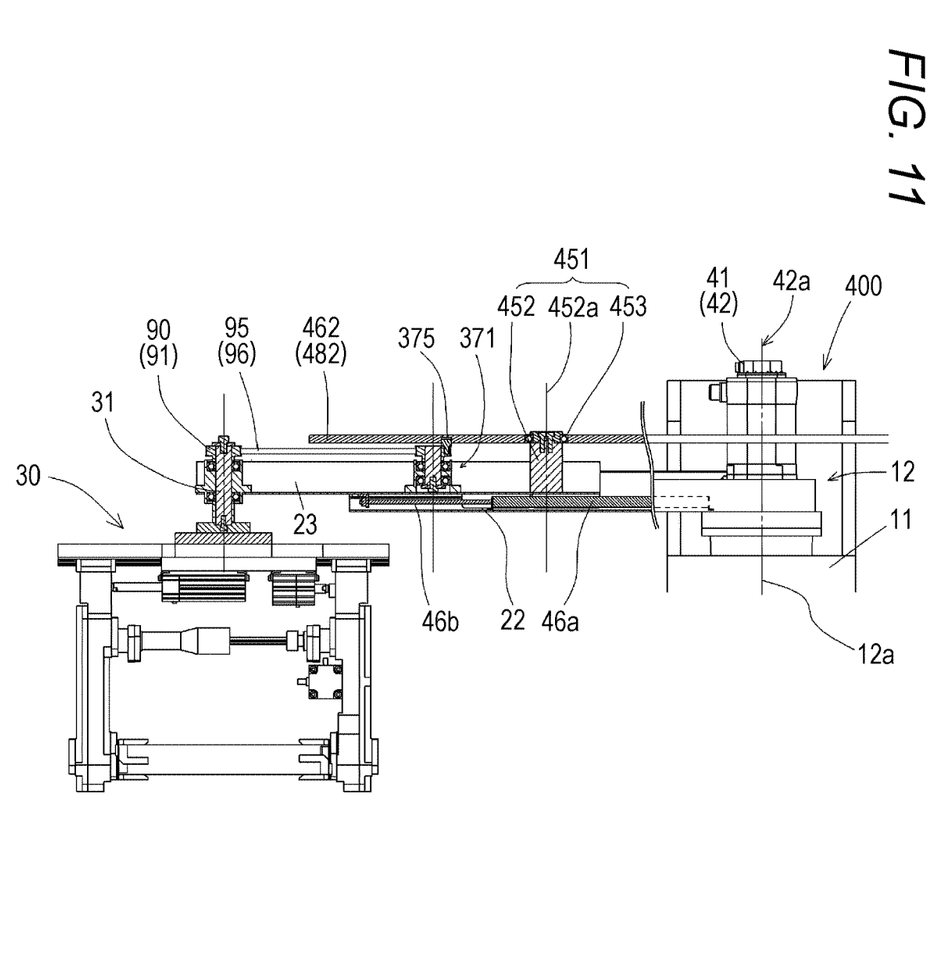
FIG. 11 is a front sectional-view of the workpiece delivery device according to a fifth embodiment of the present invention.
Figure 12:
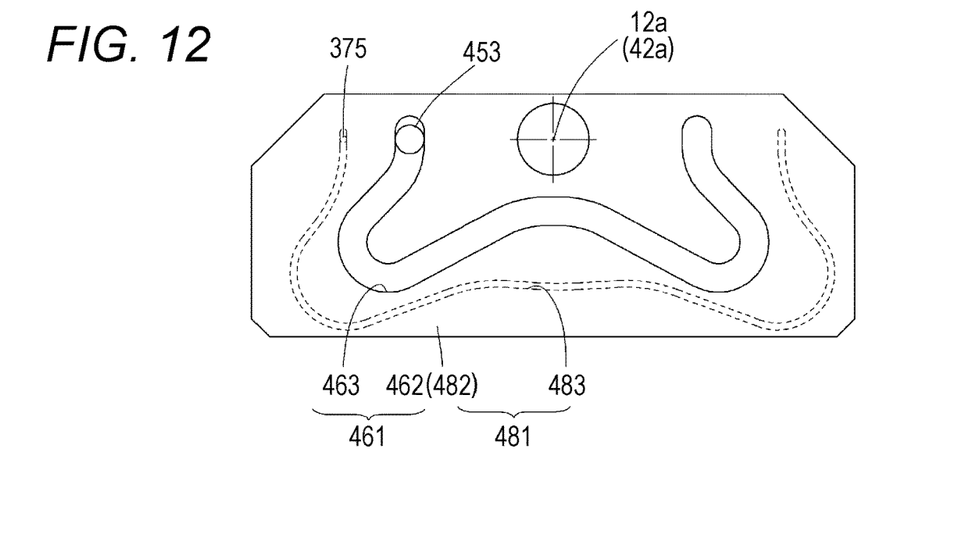
FIG. 12 is a plan view of the workpiece delivery device according to the fifth embodiment of the present invention.

A workpiece delivery device 400 of a fifth embodiment will be described with reference to FIGS. 11 and 12. Specifically, a track turning transmission part 451, a track guide part 461, and a rotation control part 481, which are different from those in the above-described embodiments, will be mainly described. The same components as those in the above-described embodiments are denoted by the same reference numerals.

The track turning transmission part 451 of the fifth embodiment has a non-rotating shaft 452 and a bearing 453 provided at the upper end of the non-rotating shaft 452. The non-rotating shaft 452 has a central axis 452$a$ in the vertical direction and is fixed to the rearmost end of the sliding arm part 23. Then, the track guide part 461 has a track guide plate 462 and a track guide hole 463, and the track turning transmission part 451 engages with the track guide hole 463. In the fifth embodiment, the track guide plate 462 which is the track guide part 461 also serves as a rotation control plate 482 which is the rotation control part 481. Alternatively, it can be expressed that the rotation control plate 482 which is the rotation control part 481 also serves as the track guide plate 462 which is the track guide part 461, but in any case, these means are both used in one plate 462 (482). The cam follower 375 which is the rotation restriction transmission part 371 is engaged with a rotation control groove (or hole) 483 provided in the one plate 462 (482).

Sixth Embodiment

Figure 13:
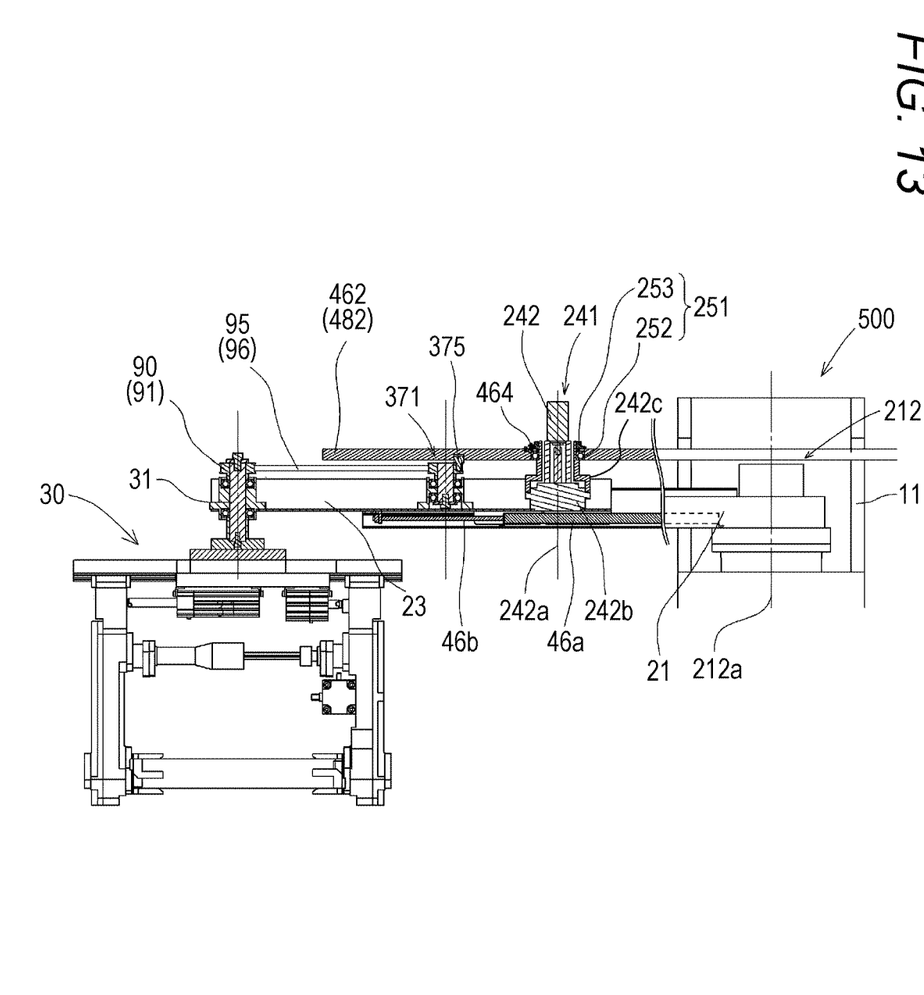
FIG. 13 is a front sectional-view of the workpiece delivery device according to a sixth embodiment of the present invention.
Figure 14:
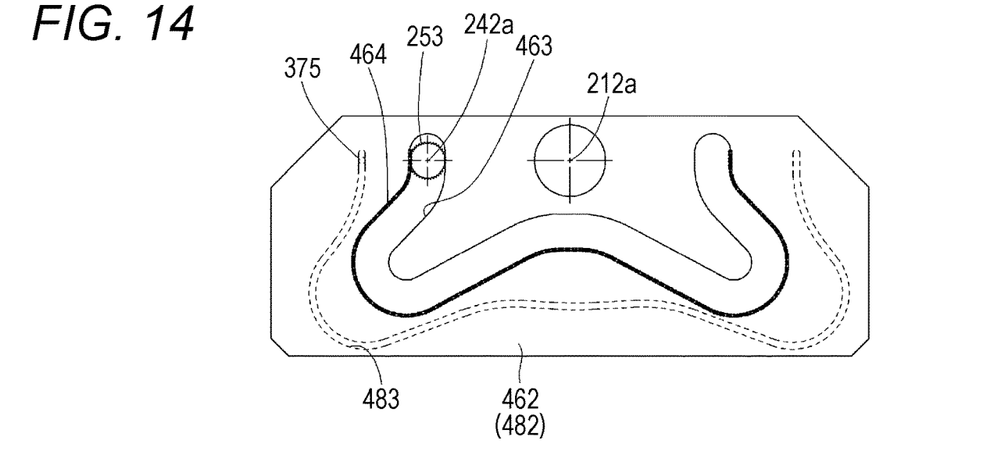
FIG. 14 is a plan view of the workpiece delivery device according to the sixth embodiment of the present invention.

A workpiece delivery device 500 of a sixth embodiment will be described with reference to FIGS. 13 and 14. Note that the sixth embodiment has the same turning center part 212 as the third embodiment, and has the same rotation restriction transmission part 371 as the fourth and fifth embodiments. Further, the track turning transmission part according to the sixth embodiment is the same as the track turning transmission part 251 of the third embodiment, but is different in that the rotation restriction transmission part is not provided on the upper portion of the motor. The track guide hole 463 of the track guide plate 462 is provided with a chain 464 to which the sprocket 253 of the track turning transmission part 251 engages. In addition, the same components as those in the above-described embodiments are denoted by the same reference numerals.

Seventh Embodiment

A workpiece delivery device 600 according to a seventh embodiment will be described with reference to FIGS. 15 and 16. The workpiece delivery device 600 unloads the workpiece W placed on a workpiece placement table 3 of the non-machining station S such as an orientation changing station that changes the orientation of the workpiece W, and loads the workpiece W to a table 3' of a machine tool M'.

The workpiece delivery device 600 according to the seventh embodiment may use any of the first to sixth embodiments, but is different from these embodiments in that a workpiece hand support shaft 631 is provided in a long length. For other configurations, any of the first to sixth embodiments may be used.

Figure 15:
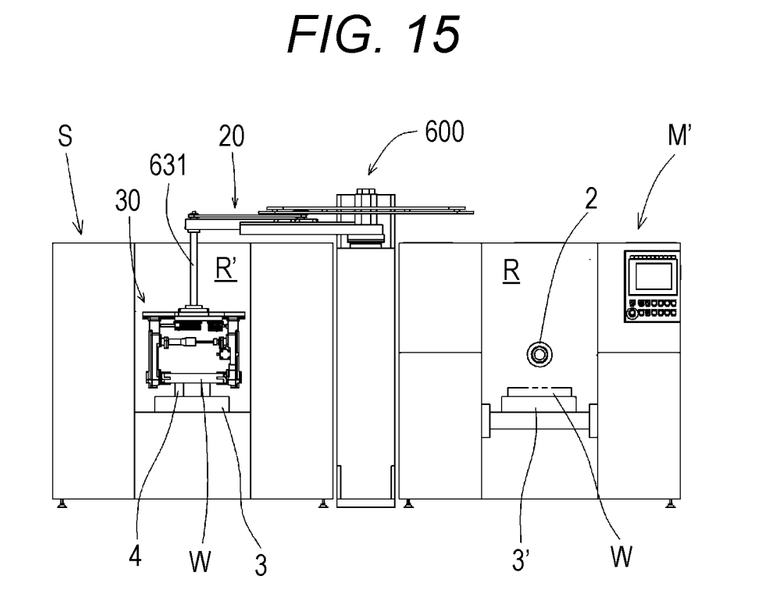
FIG. 15 is a schematic view illustrating workpiece delivery (workpiece-unloading) between a non-machining station and a machine tool having a configuration different from that of FIG. 1 in which a workpiece hand support shaft of the present invention is long.

As illustrated in FIG. 15, when the turning arm 20 turns and the workpiece hand 30 is located on the table 3 in a work room R' of the non-machining station S, a lifting part 4 provided on the table 3 and for raising and lowering the workpiece W lifts up the workpiece W. The lifted workpiece W is disengaged from a positioning pin (not shown) on the table 3 and is clamped by the clamping arm 342 of the workpiece hand 30.

Figure 16:
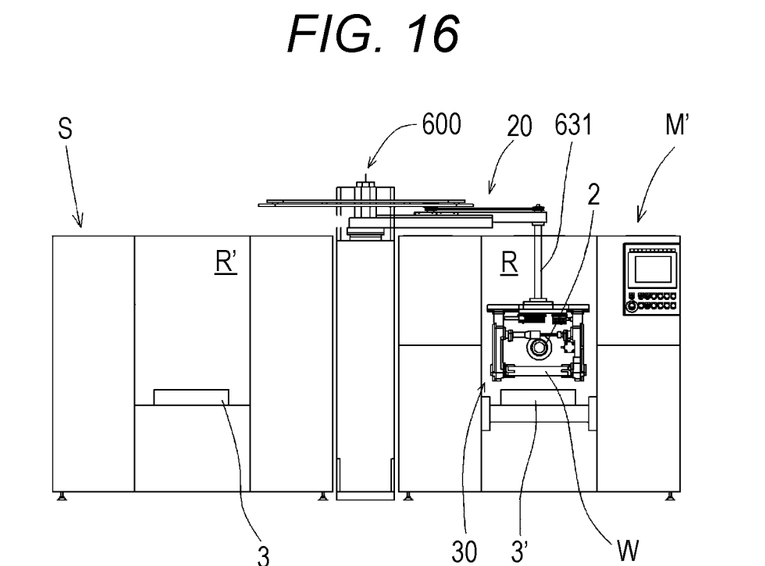
FIG. 16 is a schematic view illustrating workpiece delivery (workpiece-loading) between the non-machining station and the machine tool having the configuration different from that of FIG. 1 in which the workpiece hand support shaft of the present invention is long.

As illustrated in FIG. 16, the turning arm 20 clamping the workpiece W turns in an opposite direction and is located on the table 3' in the machining chamber R of the machine tool M'. The lifting part (not shown) on the table 3' is raised, and the clamping arm 342 unclamps the workpiece W to place the workpiece W on the table. When the lifting part is lowered, the workpiece W is placed on the table 3'.

The machine tool M' or the non-machining station S using the workpiece delivery device 600 according to the seventh embodiment can be used, for example, in the machine tool or the non-machining station having a low table position.

Other Embodiments

In the present invention, in addition to the above-described embodiments, various embodiments such as the following can be used.

In the seventh embodiment, a long workpiece hand support shaft is used, but if it is a machine tool in which the table is supported by a Y-axis mechanism that moves up and down like the machine tool described in Patent Literatures 1 and 2, the length of the workpiece hand support shaft can be reduced. In any case, the workpiece hand support shaft in the first to seventh embodiments can be determined by a height of the table or a configuration of the machine tool. Note that the non-machining station S may be not only a workpiece orientation changing station, but also the non-machining station such as a station for cleaning the workpiece, a station for receiving and delivering the workpiece with another line, a station for inspection, and a station for measurement.

Further, in the first to sixth embodiments, an example in which the pulley is used for the rotation restriction transmission part and the rotation restriction receiving part is described, but it is not limited to the pulley, and the gear, the sprocket, or the like can also be used. In that case, the connection part is the belt or the chain.

Further, the track guide plate and the rotation control plate shown in the plan view are merely examples, and are not limited to the shapes shown in the drawings, and a support part supported by the base can also have various forms, and thus detailed explanation is omitted. Further, the same applies to the support part of the track guide rail, and the track guide rail may be supported by the base or may also be supported by the rotation control plate. The turning drive auxiliary part is the fluid pressure cylinder, but may be an electric, a hydraulic, a pneumatic cylinder, or the like. Further, an example of the rail which is the track guide part is the round bar, but it goes without saying that the rail is not limited to this.

This international application claims priority based on Japanese Patent Application No. 2018-240386, which is the Japanese patent application filed on Dec. 21, 2018, and the entire contents of Japanese Patent Application No. 2018-240386 which is the Japanese patent application is incorporated into this international application.

The above description of a specific embodiment of the present invention is presented for purposes of illustration. They are not intended to be exhaustive or to limit the present invention as it is in a described form. It is apparent to those skilled in the art that numerous modifications and changes can be made in the light of the above description.

LIST OF THE REFERENCE NUMERALS

1: Opening and closing cover,
2: Spindle,
3, 3': Table (Workpiece placement table),
4: Workpiece lifting part,
10, 100, 200, 300, 400, 500, 600: Workpiece delivery device,
11: Base, 12, 212: Turning center part,
20: Turning arm (21: Base arm part; 23: Sliding arm part),
30: Workpiece hand (31, 231, 631: Workpiece hand support shaft),
40: Track turning mechanism,
41, 241: Turning drive part (42, 242: Motor),
45: Turning drive auxiliary part (46: Fluid pressure cylinder),
51, 251, 451: Track turning transmission part (52, 252: Bearing; 253: Sprocket),
151, 351: Track turning transmission part (153, 353: Roller),
61, 261, 461: Track guide part (62, 262, 462: Track guide plate; 63, 263, 463: Track guide hole; 264, 464: Chain),
161: Track guide part (162: Rail),
70: Rotation control mechanism,
71, 171, 271, 371: Rotation restriction transmission part (73, 173, 273, 373: Pulley; 75, 175, 275, 375: Cam follower),
81, 381, 481: Rotation control part (82, 382, 482: Rotation control plate; 83, 383, 483: Rotation control hole (groove)),
90: Rotation restriction receiving part (91: Pulley),
95: Connection part (96: Timing belt), M, M': Machine tool,
P: Mark,
S: Non-machining station,
R, R': Machining chamber, Work room,
W, W': Workpiece.

The invention claimed is:

1. A workpiece delivery device that unloads a workpiece from a table on one side and loads the workpiece to a table on the other side between machine tools constituting a line, between the machine tool and a non-machining station, or between non-machining stations, the workpiece delivery device comprising:
   a base;
   a turning center part provided on the base;
   a turning arm that horizontally turns above and in front of the machine tool and the non-machining station about an axis of the turning center part;
   a workpiece hand that is suspended and supported by a tip portion of the turning arm;
   a track turning mechanism that determines a conveyor track of the workpiece; and
   a rotation control mechanism that controls an orientation of the workpiece hand, wherein
   the track turning mechanism has a turning drive part, a track turning transmission part, and a track guide part,
   the rotation control mechanism has a rotation restriction transmission part, a rotation control part, and a rotation restriction receiving part,
   the turning center part, the turning drive part, the track turning transmission part, the rotation restriction transmission part, and the rotation restriction receiving part are provided on the turning arm,
   at least one of the track guide part and the rotation control part is provided on the base,
   the rotation restriction receiving part is provided on a workpiece hand support shaft that rotatably supports the workpiece hand,
   the rotation restriction transmission part and the rotation restriction receiving part are connected to each other by a connection part,
   the track guide part includes a track guide plate; and a track guide hole or a track guide groove provided in the track guide plate,
   the track turning transmission part is engaged with the track guide hole or the track guide groove,
   the rotation control part includes a rotation control plate; and a rotation control hole or a rotation control groove provided in the rotation control plate, and
   the rotation restriction transmission part is engaged with the rotation control hole or the rotation control groove,
   wherein the track guide plate is directly and at least partially above the rotation control plate in an up-down direction.

2. The workpiece delivery device according to claim 1, wherein the turning arm has a base arm part supported by the turning center part, a linear motion guide mechanism fixed to the base arm part, and a sliding arm part that slides on the base arm part by the linear motion guide mechanism, and the track turning transmission part and the rotation restriction transmission part are provided on the sliding arm part.

3. The workpiece delivery device according to claim 1, wherein the track turning transmission part is a bearing that engages with the track guide hole.

4. The workpiece delivery device according to claim 1, wherein the base is a column erected on a floor.

5. The workpiece delivery device according to claim 1, wherein a length of the workpiece hand support shaft is determined according to a configuration of the workpiece hand and the machine tool or the non-machining station.

6. A workpiece delivery device that unloads a workpiece from a table on one side and loads the workpiece to a table on the other side between machine tools constituting a line, between the machine tool and a non-machining station, or between non-machining stations, the workpiece delivery device comprising:
   a base;
   a turning center part provided on the base;
   a turning arm that horizontally turns above and in front of the machine tool and the non-machining station about an axis of the turning center part;
   a workpiece hand that is suspended and supported by a tip portion of the turning arm;
   a track turning mechanism that determines a conveyor track of the workpiece; and
   a rotation control mechanism that controls an orientation of the workpiece hand, wherein
   the track turning mechanism has a turning drive part, a track turning transmission part, and a track guide part,
   the rotation control mechanism has a rotation restriction transmission part, a rotation control part, and a rotation restriction receiving part
   the turning center part, the turning drive part, the track turning transmission part, the rotation restriction transmission part, and the rotation restriction receiving part are provided on the turning arm,
   at least one of the track guide part and the rotation control part is provided on the base,
   the rotation restriction receiving part is provided on a workpiece hand support shaft that rotatably supports the workpiece hand,
   the rotation restriction transmission part and the rotation restriction receiving part are connected to each other by a connection part, and
   the turning arm is provided with a fluid pressure cylinder as a turning drive auxiliary part.

7. The workpiece delivery device according to claim 6, wherein the base is a column erected on a floor.

8. The workpiece delivery device according to claim 6, wherein a length of the workpiece hand support shaft is determined according to a configuration of the workpiece hand and the machine tool or the non-machine station.

9. A workpiece delivery device that unloads a workpiece from a table on one side and loads the workpiece to a table on the other side between machine tools constituting a line, between the machine tool and a non-machining station, or between non-machining stations, the workpiece delivery device comprising:
a base;
a turning center part provided on the base;
a turning arm that horizontally turns above and in front of the machine tool and the non-machining station about an axis of the turning center part;
a workpiece hand that is suspended and supported by a tip portion of the turning arm;
a track turning mechanism that determines a conveyor track of the workpiece; and
a rotation control mechanism that controls an orientation of the workpiece hand, wherein
the track turning mechanism has a turning drive part, a track turning transmission part, and a track guide part,
the rotation control mechanism has a rotation restriction transmission part, a rotation control part, and a rotation restriction receiving part,
the turning center part, the turning drive part, the track turning transmission part, the rotation restriction transmission part, and the rotation restriction receiving part are provided on the turning arm,
at least one of the track guide part and the rotation control part is provided on the base,
the rotation restriction receiving part is provided on a workpiece hand support shaft that rotatably supports the workpiece hand,
the rotation restriction transmission part and the rotation restriction receiving part are connected to each other by a connection part,
the rotation control part is a rotation control hole or a rotation control groove provided in a rotation control plate,
the rotation restriction transmission part has a sprocket or a gear provided on a central axis of the rotation restriction transmission part, and a cam follower provided at a position eccentric from the central axis,
the cam follower engages with the rotation control hole or the rotation control groove,
the rotation restriction receiving part is a sprocket or a gear provided on the workpiece hand support shaft, and
the connection part is a chain or a belt that connects the sprockets or the gears.

10. The workpiece delivery device according to claim 4, wherein the base is a column erected on a floor.

11. The workpiece delivery device according to claim 9, wherein a length of the workpiece hand support shaft is determined according to a configuration of the workpiece hand and the machine tool or the non-machine station.

12. A workpiece delivery device that unloads a workpiece from a table on one side and loads the workpiece to a table on the other side between machine tools constituting a line, between the machine tool and a non-machining station, or between non-machining stations, the workpiece delivery device comprising:
a base;
a turning center part provided on the base;
a turning arm that horizontally turns above and in front of the machine tool and the non-machining station about an axis of the turning center part;
a workpiece hand that is suspended and supported by a tip portion of the turning arm;
a track turning mechanism that determines a conveyor track of the workpiece; and
a rotation control mechanism that controls an orientation of the workpiece hand, wherein
the track turning mechanism has a turning drive part, a track turning transmission part, and a track guide part,
the rotation control mechanism has a rotation restriction transmission part, a rotation control part, and a rotation restriction receiving part,
the turning center part, the turning drive part, the track turning transmission part, the rotation restriction transmission part, and the rotation restriction receiving part are provided on the turning arm,
at least one of the track guide part and the rotation control part is provided on the base,
the rotation restriction receiving part is provided on a workpiece hand support shaft that rotatably supports the workpiece hand, and
the rotation restriction transmission part and the rotation restriction receiving part are connected to each other by a connection part, and
a central axis of the track turning transmission part and a central axis of the rotation restriction transmission part are provided coaxially.

13. The workpiece delivery device according to claim 12, wherein the base is a column erected on a floor.

14. The workpiece delivery device according to claim 12, wherein a length of the workpiece hand support shaft is determined according to a configuration of the workpiece hand and the machine tool or the non-machine station.

15. A workpiece delivery device that unloads a workpiece from a table on one side and loads the workpiece to a table on the other side between machine tools constituting a line, between the machine tool and a non-machining station, or between non-machining stations, the workpiece delivery device comprising:
a base;
a turning center part provided on the base;
a turning arm that horizontally turns above and in front of the machine tool and the non-machining station about an axis of the turning center part;
a workpiece hand that is suspended and supported by a tip portion of the turning arm;
a track turning mechanism that determines a conveyor track of the workpiece; and
a rotation control mechanism that controls an orientation of the workpiece hand, wherein
the track turning mechanism has a turning drive part, a track turning transmission part, and a track guide part,
the rotation control mechanism has a rotation restriction transmission part, a rotation control part, and a rotation restriction receiving part,
the turning center part, the turning drive part, the track turning transmission part, the rotation restriction transmission part, and the rotation restriction receiving part are provided on the turning arm,
at least one of the track guide part and the rotation control part is provided on the base,
the rotation restriction receiving part is provided on a workpiece hand support shaft that rotatably supports the workpiece hand,
the rotation restriction transmission part and the rotation restriction receiving part are connected to each other by a connection part, the track guide part is a track quide plate and a track guide hole provided in the track guide plate, and the track turning transmission part is a bearing that engages with the track guide hole, and the track turning transmission part further has a sprocket or a gear, and the sprocket or the gear engages with a chain or a belt provided along the track guide hole.

16. The workpiece delivery device according to claim 15, wherein the base is a column erected on a floor.

17. The workpiece delivery device according to claim 15, wherein a length of the workpiece hand support shaft is determined according to a configuration of the workpiece hand and the machine tool or the non-machine station.

18. A workpiece delivery device that unloads a workpiece from a table on one side and loads the workpiece to a table on the other side between machine tools constituting a line, between the machine tool and a non-machining station, or between non-machining stations, the workpiece delivery device comprising:
- a base;
- a turning center part provided on the base;
- a turning arm that horizontally turns above and in front of the machine tool and the non-machining station about an axis of the turning center part;
- a workpiece hand that is suspended and supported by a tip portion of the turning arm;
- a track turning mechanism that determines a conveyor track of the workpiece; and
- a rotation control mechanism that controls an orientation of the workpiece hand, wherein the track turning mechanism has a turning drive part, a track turning transmission part, and a track guide part, the rotation control mechanism has a rotation restriction transmission part, a rotation control part, and a rotation restriction receiving part, the turning center part, the turning drive part, the track turning transmission part, the rotation restriction transmission part, and the rotation restriction receiving part are provided on the turning arm, at least one of the track guide part and the rotation control part is provided on the base, the rotation restriction receiving part is provided on a workpiece hand support shaft that rotatably supports the workpiece hand, the rotation restriction transmission part and the rotation restriction receiving part are connected to each other by a connection part, the track guide part is a track guide plate and a track guide hole provided in the track guide plate, and the track turning transmission part is a bearing that engages with the track guide hole, and the track guide hole and a rotation control hole or a rotation control groove provided in a rotation control plate are provided in one plate.

19. The workpiece delivery device according to claim 18, wherein the base is a column erected on a floor.

20. The workpiece delivery device according to claim 18, wherein a length of the workpiece hand support shaft is determined according to a configuration of the workpiece hand and the machine tool or the non-machine station.

* * * * *